(12) United States Patent
Kamiyama et al.

(10) Patent No.: US 7,481,246 B2
(45) Date of Patent: Jan. 27, 2009

(54) LATERAL PIPE LINING MATERIAL AND LATERAL PIPE LINING METHOD

(75) Inventors: Takao Kamiyama, Hiratsuka (JP); Koji Kaneta, Hiratsuka (JP); Kenji Fujii, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 0 days.

(21) Appl. No.: 11/880,979

(22) Filed: Jul. 25, 2007

(65) Prior Publication Data

US 2008/0029177 A1 Feb. 7, 2008

(30) Foreign Application Priority Data

Aug. 3, 2006 (JP) .............................. 2006-211546

(51) Int. Cl.
*F16L 55/16* (2006.01)
(52) U.S. Cl. ........................ 138/98; 138/97; 156/287; 264/269
(58) Field of Classification Search ................ 138/98, 138/97; 405/150.1, 184.1, 184.2, 184.5; 156/287, 156, 293, 294; 264/267, 269, 516, 264/36; 277/606, 617
See application file for complete search history.

(56) References Cited

U.S. PATENT DOCUMENTS

| | | | | |
|---|---|---|---|---|
| 4,693,482 A | * | 9/1987 | Daigle et al. | 277/606 |
| 5,609,439 A | * | 3/1997 | Schreiner et al. | 405/184.2 |
| 5,971,032 A | * | 10/1999 | Ward | 138/98 |
| 6,082,411 A | * | 7/2000 | Ward | 138/98 |
| 6,085,794 A | * | 7/2000 | Kamiyama et al. | 138/98 |
| 6,206,049 B1 | * | 3/2001 | Ward | 138/98 |
| 6,641,688 B1 | * | 11/2003 | Gearhart | 156/95 |
| 6,688,337 B2 | * | 2/2004 | Ward | 138/98 |
| 6,948,883 B2 | * | 9/2005 | Osibamowo et al. | 405/184.2 |
| 7,094,308 B1 | * | 8/2006 | Gearhart | 156/293 |

* cited by examiner

*Primary Examiner*—Patrick F Brinson
(74) *Attorney, Agent, or Firm*—Adams & Wilks

(57) ABSTRACT

A lateral pipe lining material comprises a tubular resin-absorbing material impregnated with a curable resin and a brim attached at one end thereof. The lining material is positioned so that the brim faces a peripheral edge of a lateral pipe opening of the main pipe. A ring-shaped gasket composed of an elastic material is attached to an upper surface of the brim, and a bonding resin is applied thereto. The gasket seals a gap between an inner peripheral surface of the main pipe and the brim. The lateral pipe lining material is evertedly inserted into the lateral pipe in a state in which the bonding resin applied to the brim is brought into contact with the inner peripheral surface of the main pipe. In such a configuration, ground water can be prevented from seeping into the bonding resin applied to the brim even if the ground water flows into the main pipe from a break of the lateral pipe.

12 Claims, 6 Drawing Sheets

LATERAL PIPE LINING MATERIAL AND LATERAL PIPE LINING METHOD

BACKGROUND OF THE INVENTION

1. Field of the Invention

The present invention relates to a lateral pipe lining material for lining a lateral pipe that branches off from a main pipe, and to a lateral pipe lining method using the lateral pipe lining material.

2. Description of the Prior Art

A pipe lining method is known in which, when an underground sewer pipe or other pipe has degraded over time, the pipe is not extracted from the ground, but, instead, a lining is applied to an inner peripheral surface of the pipe to repair the pipe. In this pipe lining method, a tubular pipe lining material comprised of a flexible tubular resin-absorbing material is used, which is impregnated with a curable resin and whose outer peripheral surface is covered with a highly airtight film. The pipe lining material is evertedly inserted into the pipe by fluid pressure and pressed against the inner peripheral surface of the pipe. In this state, the pipe lining material is heated to cure the curable resin impregnated therein, thereby lining the inner peripheral surface of the pipe.

The above-described method can also be used for lateral pipes that branch off from a main pipe. Such a lateral pipe lining method is disclosed in, e.g., Japanese Laid-open Patent Application No. 1994-270253. In this method, a work robot is used to bring a brim formed on one end of a lateral pipe lining material into close contact with a peripheral edge of a lateral pipe opening of the main pipe. The lateral pipe lining material is then evertedly inserted into the lateral pipe. The curable resin in the lateral pipe lining material is cured and the lateral pipe is lined while the evertedly inserted lateral pipe lining material is pressed against an inner peripheral surface of the lateral pipe. The resin impregnated into the lateral pipe lining material flows into a gap between a surface of the brim on an opening side and an inner surface of the main pipe. This allows the main pipe to be integrally joined with the lateral pipe lining material.

The lateral pipe is usually lined before the main pipe is lined. However, the lateral pipe may also be lined after the main pipe is lined (also referred to as "after lining").

However, a problem arises in that, when water seeps from the ground into a portion that is to be lined, the water will seep into a gap between a lateral pipe opening of a main pipe and a brim of a lateral pipe lining material, and it will become impossible to cure a thermosetting resin. In addition, a problem arises in that, when an adhesive composed of thermosetting resin is applied to a surface of the brim on a lateral pipe opening side, the resin will become fluid and flow away from the surface of the brim due to heat generated when the resin is cured.

It is therefore an object of the present invention to provide a pipe lining material and a lateral pipe lining method that can be used to securely line a lateral pipe even at a work site where water will seep in from the ground.

SUMMARY OF THE INVENTION

A lateral pipe lining material comprises a tubular resin-absorbing material impregnated with a curable resin and a brim attached at one end thereof. When the lateral pipe is to be lined, the lateral pipe lining material is inserted into the lateral pipe with the brim being brought close to a peripheral edge of a lateral pipe opening of a main pipe. According to the present invention, a sealing member composed of an elastic material is attached on a surface of the brim on the lateral pipe opening side at a portion on the tubular resin-absorbing material side in order to seal a gap that is formed between an inner peripheral surface of the main pipe and a surface of the brim facing the inner peripheral surface thereof when the lateral pipe lining material is inserted into the lateral pipe.

The sealing member is a ring-shaped sealing member, and a bonding resin is applied to a surface of the brim on the lateral pipe opening side. In another embodiment, a groove, to which a bonding resin is applied, is formed on a surface of the brim on the lateral pipe opening side. Furthermore, a member for preventing the applied bonding resin from flowing away from the brim is attached to the surface of the brim on the lateral pipe opening side.

A lateral pipe lining method according to the present invention is for lining a lateral pipe that branches off from a main pipe, wherein a lateral pipe lining material is prepared that comprises a tubular resin-absorbing material impregnated with a curable resin and a brim attached at one end thereof. A sealing member composed of an elastic material is attached on a surface of the brim on the lateral pipe opening side at a portion on the tubular resin-absorbing material side, and a bonding resin is applied to a surface of the brim on the lateral pipe opening side. The brim of the lateral pipe lining material is brought close to the peripheral edge of the lateral pipe opening of the main pipe so that the sealing member seals a gap between an inner peripheral surface of the main pipe and a surface of the brim facing the inner peripheral surface thereof. The lateral pipe lining material is then evertedly inserted into the lateral pipe in a state in which the bonding resin applied to the brim comes into contact with the inner peripheral surface of the main pipe. The resin in the lateral pipe lining material is then cured in a state in which the evertedly inserted lateral pipe lining material is pressed against the inner peripheral surface of the lateral pipe. At this time, the bonding resin bonds the brim of the lateral pipe lining material to the inner peripheral surface of the main pipe, thereby integrating the lateral pipe lining material and the main pipe.

According to the present invention, a lateral pipe lining method is also provided for lining a lateral pipe that branches off from a main pipe, wherein a lateral pipe lining material is prepared that comprises a tubular resin-absorbing material impregnated with a curable resin and a brim attached at one end thereof, and the lateral pipe lining is positioned so that the brim faces a peripheral edge of a lateral pipe opening of the main pipe. Next, a sealing member composed of an elastic material is attached on a surface of the brim on the lateral pipe opening side at a portion on the tubular resin-absorbing material side, and a bonding resin is applied to the surface of the brim on the lateral pipe opening side. The brim of the lateral lining material is brought close to the peripheral edge of the lateral pipe opening of the main pipe so that the sealing member seals a gap between an inner peripheral surface of the main pipe and a surface of the brim facing the inner peripheral surface thereof. The lateral pipe lining material is then evertedly inserted into the lateral pipe in a state in which the bonding resin applied to the brim comes into contact with the inner peripheral surface of the main pipe. The bonding resin bonds the brim of the lateral pipe lining material to the inner peripheral surface of the main pipe to integrate the lateral pipe lining material and the main pipe, when the resin in the lateral pipe lining material is cured in a state in which the evertedly inserted lateral pipe lining material is pressed against the inner peripheral surface of the lateral pipe.

According to the present invention, water does not seep into the gap between the peripheral edge of the lateral pipe opening of the main pipe and the brim of the lateral pipe lining material. Therefore, the bonding resin applied to the brim can be prevented from losing its adhesive ability due to water seeping in, and the bonding resin can be prevented from becoming fluid and flowing away from the surface of the brim due to the heat generated when the resin is cured.

Further features of the invention, its nature and various advantages will be more apparent from the accompanying drawings and following detailed description of the invention.

BRIEF DESCRIPTION OF THE DRAWINGS

FIG. 2b is a cross-sectional view of the brim along a line X-X' in FIG. 2a;

DESCRIPTION OF THE PREFERRED EMBODIMENTS

The present invention will now be described in detail with reference to the embodiments shown in the accompanying drawings.

Figure 1:
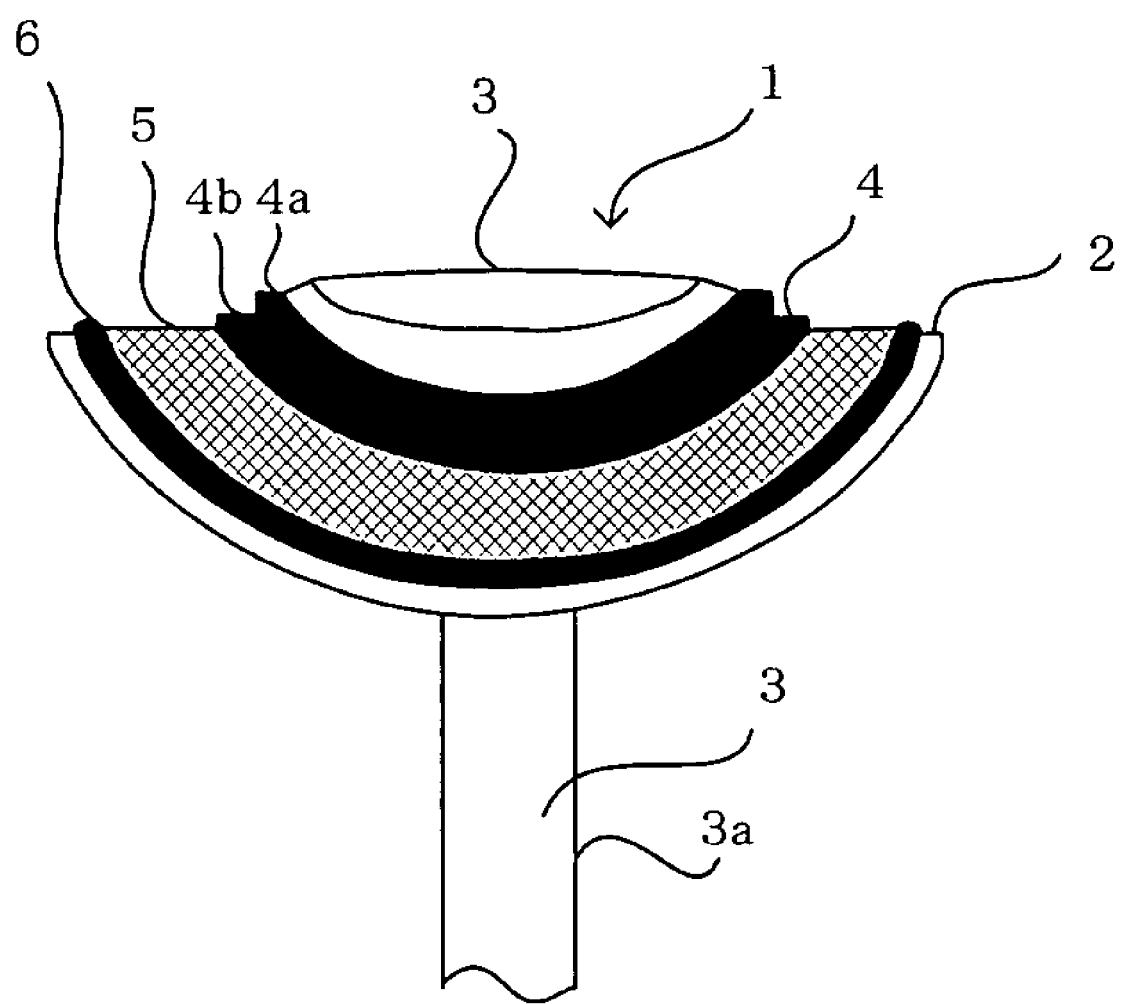
FIG. 1 is a side view of a lateral pipe lining material according to the present invention.

A lateral pipe lining material 1 shown in FIG. 1 comprises a flexible tubular resin-absorbing material 3 composed of a nonwoven cloth. One end of the tubular resin-absorbing material is folded back in an outward direction and is coupled with a flange-shaped brim 2. The tubular resin-absorbing material 3 is impregnated with an uncured liquid thermosetting resin. An airtight plastic film 3a is coated onto an outer surface (outer peripheral surface) of this portion. Polyester, polypropylene, nylon, acrylic, vinylon, and the like are used for the material of the nonwoven cloth constituting the tubular resin-absorbing material 3. Unsaturated polyester resin, epoxy resin, or the like is used for the thermosetting resin impregnated therein. Polyurethane, polyethylene, polyethylene/nylon copolymer, vinyl chloride or the like is used for the material of the plastic film 3a.

Figure 3:
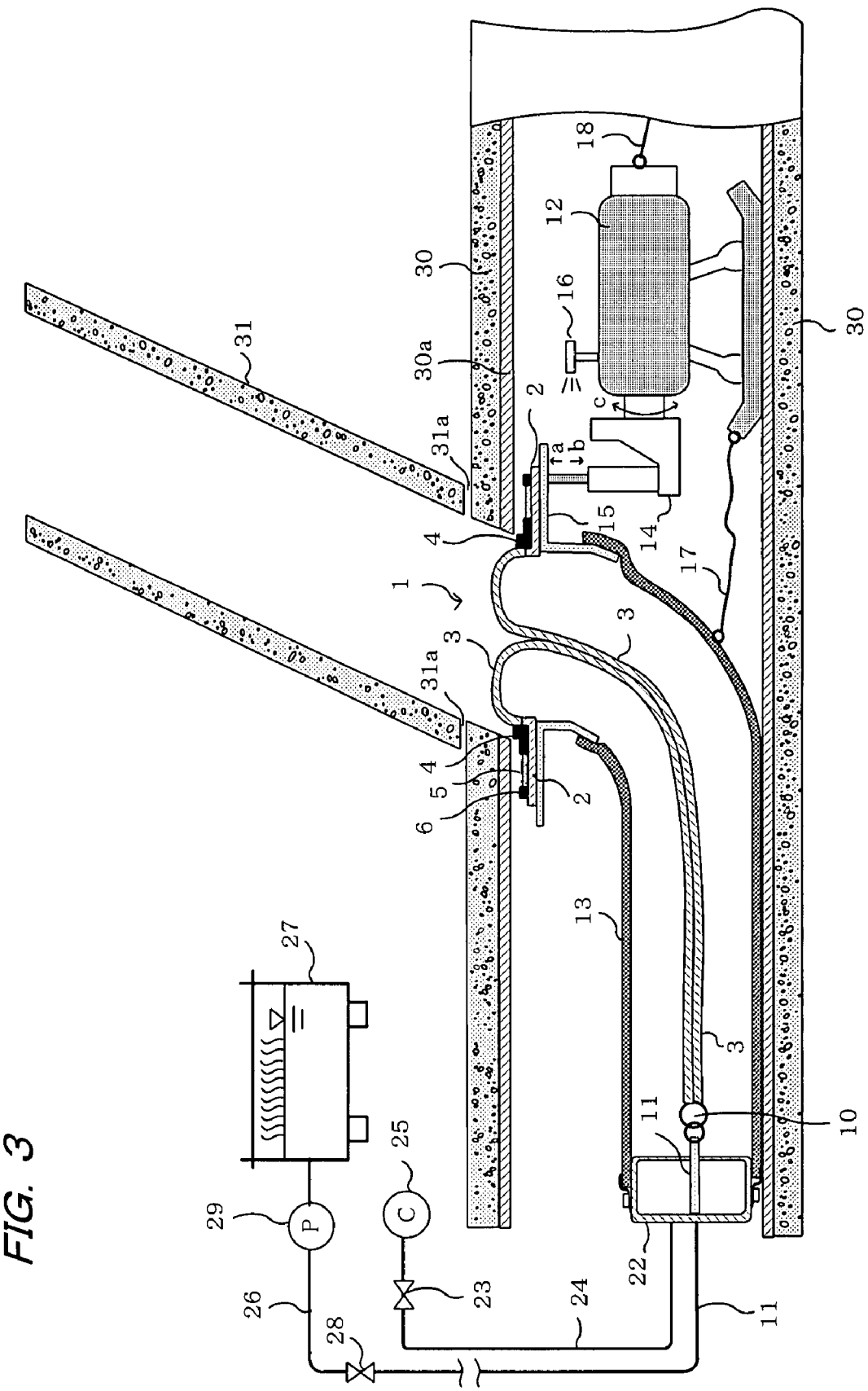
FIG. 3 is an illustrative view showing a lateral pipe lining method according to the present invention.

The brim 2 formed on one end of the tubular resin-absorbing absorbing material 3 has a curved surface that curves in an arched form with the same curvature as a main pipe 30 (FIG. 3) described below. An outer diameter of the brim is larger than the inner diameter of a lateral pipe 31 (FIG. 3). The curable resin impregnated in the brim 2 is cured in order to hold its shape.

Figure 2A:
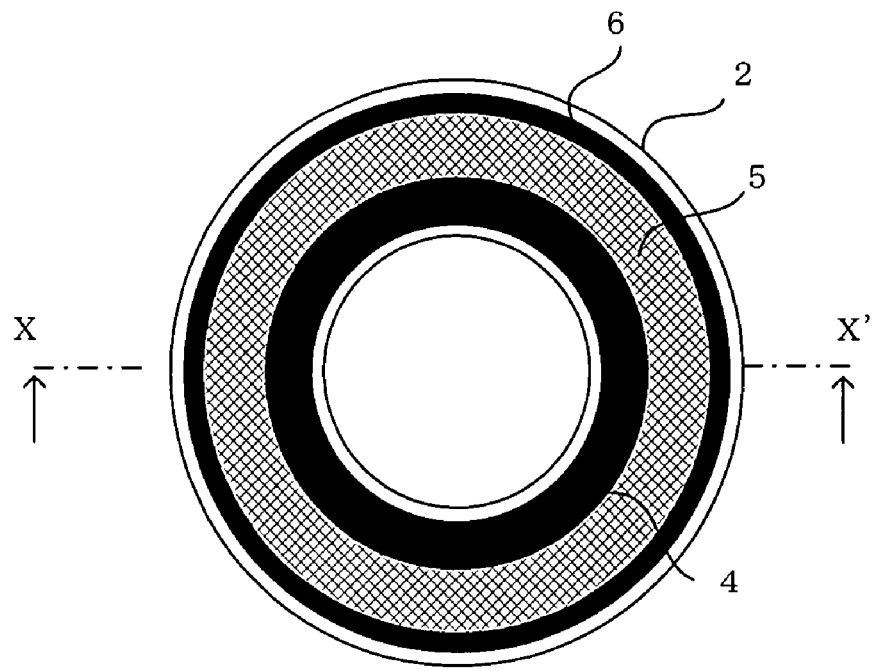
FIG. 2a is a development showing a brim of the lateral pipe lining material.
Figure 2B:
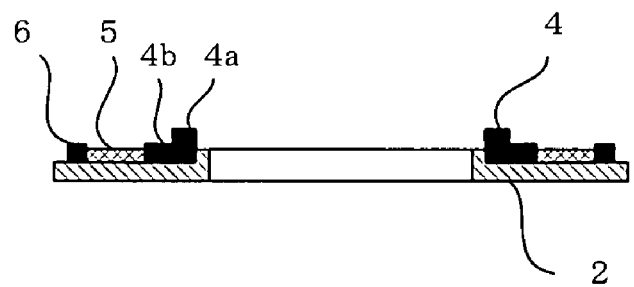

As described below, the lateral pipe lining material 1 is evertedly inserted into the lateral pipe with the brim thereof being in contact with the peripheral edge of the lateral pipe opening of the main pipe. A ring-shaped gasket 4 as shown in FIG. 2 is attached to a lateral pipe-side surface of the brim 2 (an upper surface in FIG. 1). The gasket 4 is a sealing member composed of a self-adhering rubber-based or sponge-based elastic material and has an annular protruding part 4a that protrudes from an upper surface 4b. An outer diameter of the protruding part 4a is substantially the same as an inner diameter of the lateral pipe opening of the main pipe.

A bonding resin 5 is applied to portions of the upper surface of the brim 2 excluding the gasket 4. The bonding resin 5 is an epoxy-based, polyurethane-based, silicon-based, or other type of adhesive. When a thermosetting resin is used, the same material as was used for the curable resin in the tubular resin-absorbing material 3 can be used. A ring-shaped gasket 6 composed of the same material as the gasket 4 is attached to an outer end part on a side opposite the side on which the tubular resin-absorbing material 3 is attached in order to prevent the applied bonding resin 5 from flowing away from the upper surface of the brim 2. Therefore, the bonding resin 5 is held between the gaskets 4 and 6 without flowing away from on the circumferential surface of the brim 2.

The gaskets 4 and 6 are attached and the bonding resin 5 is applied at the work site where the lateral pipe is to be lined. However, the gaskets 4 and 6 can be anchored and attached to the brim 2 in advance and then transported to the work site.

A process for lining a lateral pipe using such a lateral pipe lining material 1 shall be described below.

Figure 4:
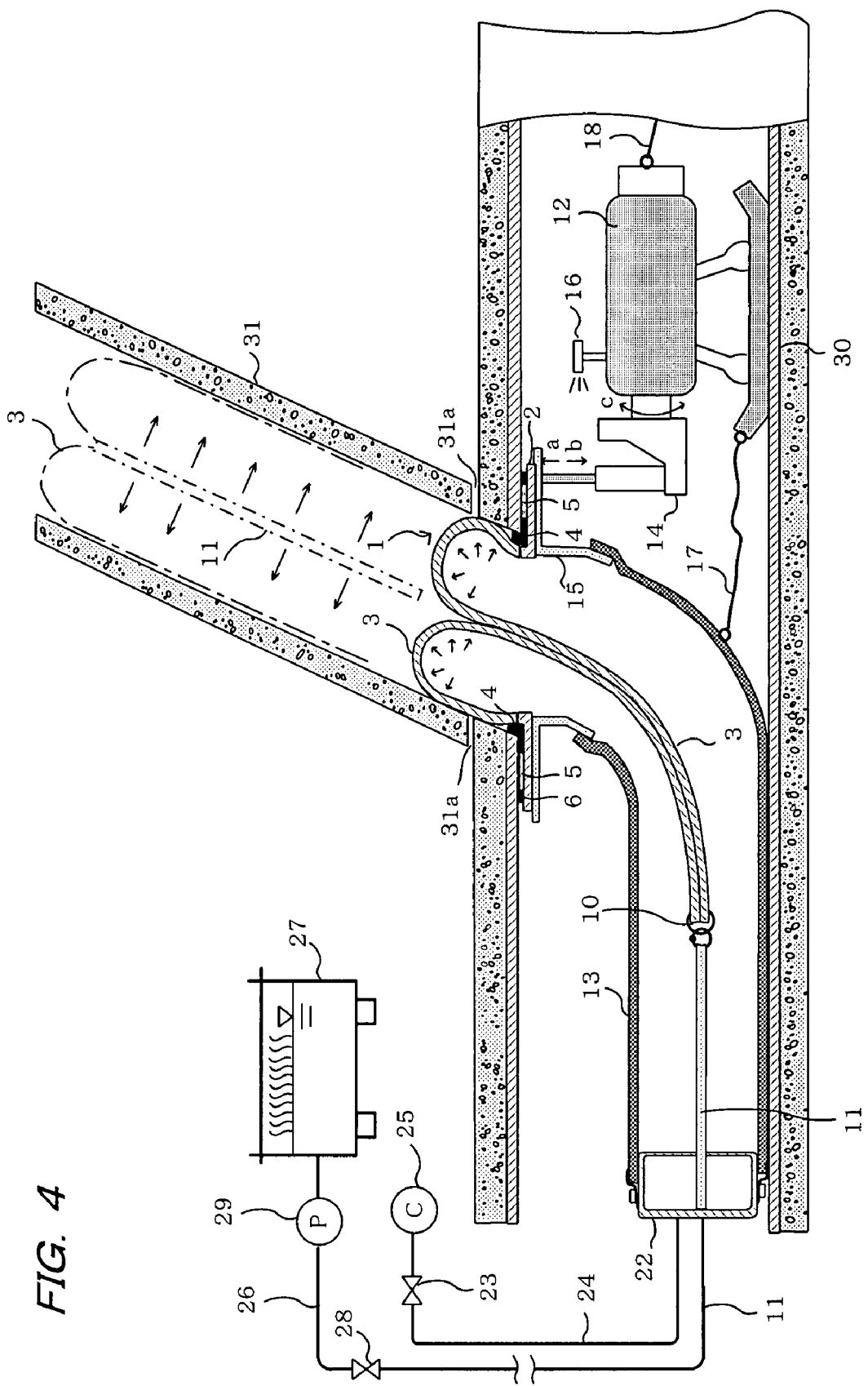
FIG. 4 is an illustrative view showing the lateral pipe lining method according to the present invention.

In FIGS. 3 and 4, the reference symbol 30 indicates a sewer pipe or other main pipe, and the reference symbol 31 indicates a small-diameter lateral pipe that branches off from the main pipe 30. A work robot 12 assembled in advance above ground, a pressure bag 13, the lateral pipe lining material 1, and the like are inserted into the main pipe 30.

In the present embodiment, the main pipe 30 has already been lined by a main pipe lining material 30a, and the lateral pipe lining process is performed as a so-called after-lining process. However, the present invention can be used for an unlined main pipe as well.

The work robot 12 is driven by hydraulic pressure, and a head 14 of the work robot is advanced in the directions of arrows a, b and rotated in the direction of an arrow c. A flange-shaped set nozzle 15 is supported on the head 14. A monitoring TV camera 16 is disposed on an upper part of the work robot 12. Pulling ropes 17, 18 are attached to a front and rear of the work robot 12. One of the pulling ropes 17 is connected to the pressure bag 13, and the other pulling rope 18 extends up to the ground.

One opening end of the pressure bag 13 is sealed in airtight fashion by a cap 22, and the other opening end is attached in airtight fashion to a cylindrical part of the set nozzle 15. The brim 2 of the lateral pipe lining material 1 is set on the set nozzle 15, and another non-everted portion thereof (a portion excluding the brim 2 of the tubular resin-absorbing material 3) is passed through the set nozzle 15 and placed in the pressure bag 13.

A steam hose 11 is attached to an end part of the tubular resin-absorbing material 3 via a connecting implement 10. The steam hose 11 passes through the cap 22 and extends out of the pressure bag 13. Steam is supplied to the steam hose 11 from a steam tank 27 via a steam pump 29, a pipe 26, and a valve 28. Pressurized air is supplied to the pressure bag 13 from a compressor 25 via a valve 23 and a pipe 24.

When the main pipe 30 has already been lined using the main pipe lining material 30a, it is drilled to form the later pipe opening in a portion of the main pipe lining material 30a that covers the lateral pipe opening of the main pipe 30.

Figure 5A:
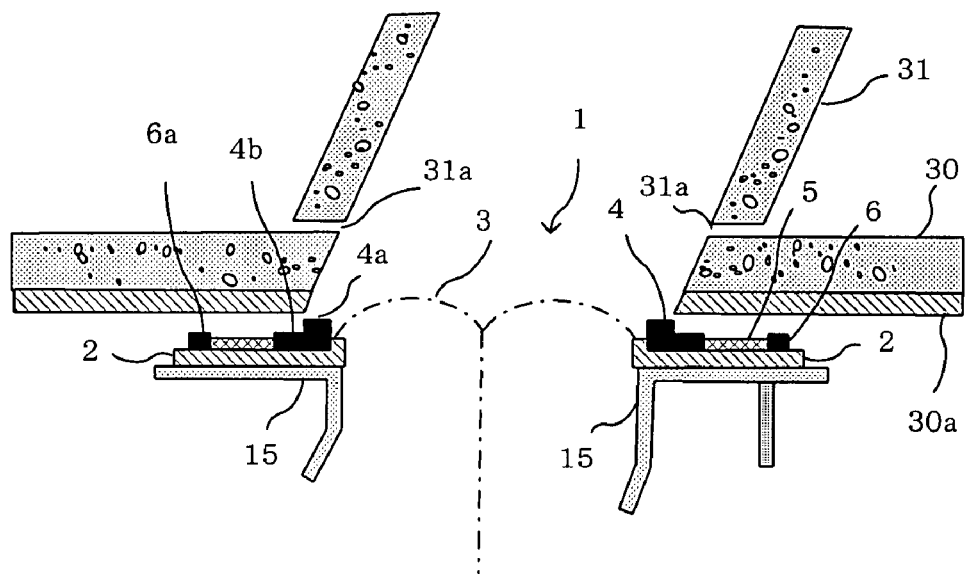
FIG. 5a is a cross-sectional view showing a state in which the brim of the lateral pipe lining material is set on a peripheral edge of a lateral pipe opening.

Next, the pulling rope 18 is pulled, whereby the work robot 12 and the lateral pipe lining material 1, pressure bag 13, and other components supported by the work robot are integrally moved in the main pipe 30. As shown in FIG. 3, the brim 2 of the lateral pipe lining material 1 is positioned at the opening of the lateral pipe 31, the head 14 of the work robot 12 is moved in the direction of the arrow a, and the brim 2 of the lateral pipe lining material 1 is set so as to face a peripheral edge of the lateral pipe opening formed in the main pipe 30. The TV camera 16 monitors such processes. This state is also shown in an enlarged view in FIG. 5a.

In instances where the gaskets 4, 6 are not attached to the brim 2 in advance, the gaskets 4, 6 are attached to the upper surface of the brim 2 in a state in which the brim 2 is set as described above. The bonding resin 5 is applied along the entire periphery of the upper surface of the brim 2 between the gaskets 4 and 6 that were either attached in advance or at the work site. When the gasket 6 is attached at the work site, the gasket 6 may also be attached after the bonding resin 5 has been applied. The applied bonding resin 5 is sandwiched by the gaskets 4 and 6 and held in place and does not flow away from the top of the surface of the brim 2.

Figure 5B:
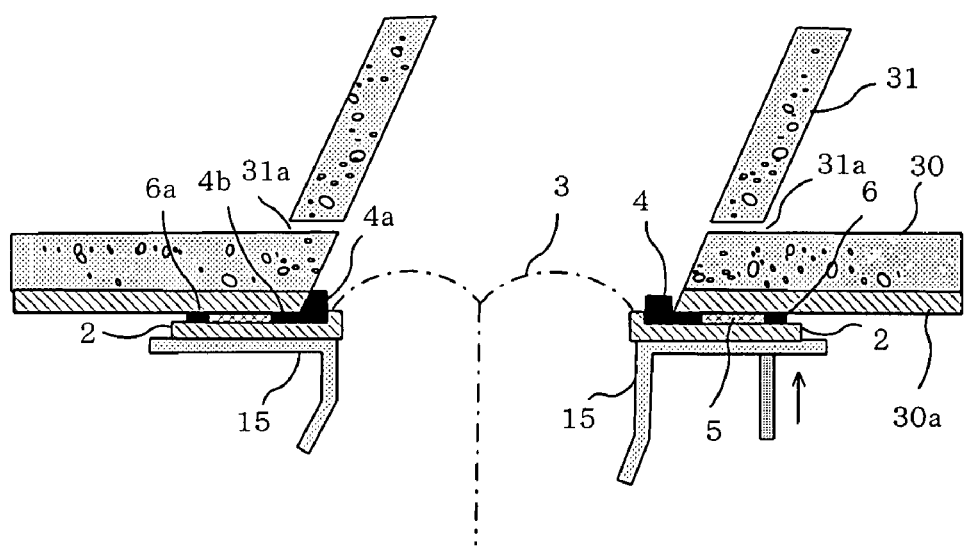
FIG. 5b is a cross-sectional view showing a state in which the brim of the lateral pipe lining material is brought close to the peripheral edge of the lateral pipe opening.

In this state, the set nozzle 15 is moved upward, and the brim 2 is brought close to the peripheral edge of the lateral pipe opening of the main pipe 30, as shown in FIG. 5b. At this time, the protruding part 4a of the gasket 4 is inserted into the opened lateral pipe opening, an upper surface 4b of the gasket 4 and an upper surface 6a of the gasket 6 are pressed and deformed by elasticity, and the bonding resin 5 is brought into close contact with the inner peripheral surface of the main pipe lining material 30a. A gap between the inner periphery of the main pipe 30 (the inner peripheral surface of the main pipe lining material when the main pipe lining material 30a has been applied) and the upper surface of the brim are sealed by the gasket 4 along the entire periphery at the inner end part on the lateral pipe side. Therefore, ground water will not seep into the bonding resin 5 applied to the brim 2 even if the ground water flows into the main pipe from a break 31a of the lateral pipe 31.

After the brim 2 has been brought close to the peripheral edge of the lateral pipe opening of the main pipe as shown in FIG. 5b, the compressor 25 is driven and pressurized air is supplied to the pressure bag 13. This causes the tubular resin-absorbing material 3 to be subjected to the pressure of the pressurized air and evertedly inserted into the lateral pipe 31 from the main pipe 30 toward the above-ground side, as shown in FIG. 4.

Once the tubular resin-absorbing material 3 has been evertedly inserted into the lateral pipe 31 a predetermined length as shown by the dotted-and-dashed line in FIG. 4, the pressure of the pressurized air is reduced, steam is sprayed from the steam hose 11, and the thermosetting resin impregnated in the tubular resin-absorbing material 3 is heated and cured in a state in which the lateral pipe lining material is pressed against the inner peripheral surface of the lateral pipe 31. At this time, heat also pervades the bonding resin 5 applied to the brim 2. Therefore, the bonding resin 5 is cured, the brim 2 and main pipe lining material 30a are securely coupled, and the lateral pipe lining material 1 and the main pipe lining material 30a are integrated.

In the above-described lateral pipe lining method, water does not seep into the gap between the peripheral edge of the lateral pipe opening of the main pipe and the brim of the lateral pipe lining material. Therefore, the seeping of water that obstructs the curing of the bonding resin 5 can be avoided, and the gaskets 4, 6 can prevent the resin 5 from becoming fluid and flowing away from the surface of the brim 2 due to heat generated when the resin 5 is cured.

In the above-described embodiment, the steam was sprayed by the hose for heat application. However, a configuration may also be adopted in which hot water is sprayed in a mist form or is provided as a shower to cure the resin.

The resin in the tubular resin-absorbing material 3 of the lateral pipe lining material 1 and the resin applied to the brim 2 were thermosetting resins. However, a photosetting resin or another type of curable resin may also be used.

Figure 6:
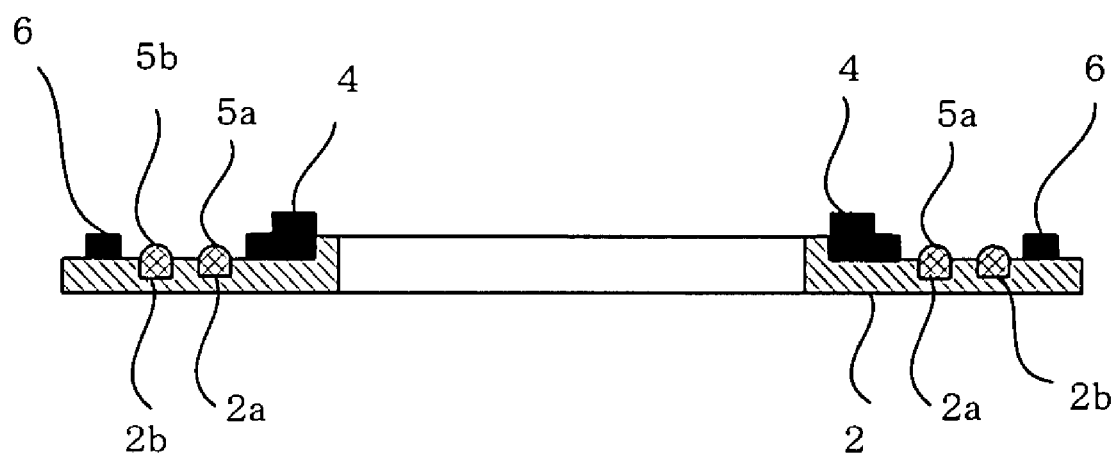
FIG. 6 is a cross-sectional view showing a modification of the brim of the lateral pipe lining material.

The bonding resin applied to the brim may be applied in such a manner that a plurality of ring-shaped grooves 2a, 2b is formed on the upper surface of the brim 2 and bonding resin 5a, 5b is filled into the grooves, as shown in FIG. 6.

What is claimed is:

1. A lateral pipe lining material comprising: a tubular resin-absorbing material impregnated with a curable resin and having a brim attached at one end thereof, the lateral pipe lining material being insertable into a lateral pipe to be lined with the brim being brought close to a peripheral edge of a lateral pipe opening of a main pipe, and a ring-shaped sealing member composed of an elastic material attached on a surface of the brim on the lateral pipe opening side at a portion on the tubular resin-absorbing material side, the ring-shaped sealing member having an annular protruding part on an upper surface thereof, the annular protruding part having an outer diameter that is substantially the same size as the inner diameter of the lateral pipe opening and being inserted into the lateral pipe opening to seal a gap that is formed between an inner peripheral surface of the main pipe and a surface of the brim facing the inner peripheral surface thereof when the lateral pipe lining material is inserted into the lateral pipe.

2. A lateral pipe lining material according to claim 1, wherein a bonding resin is applied to the surface of the brim, excluding the sealing member, on the lateral pipe opening side.

3. A lateral pipe lining material according to claim 1, wherein one or more ring-shaped grooves are formed on the surface of the brim on the lateral pipe opening side, and a bonding resin is applied to each groove.

4. A lateral pipe lining material according to claim 3, wherein a member for preventing the applied bonding resin from flowing away from the brim is attached to the surface of the brim on the lateral pipe opening side.

5. A lateral pipe lining method for lining a lateral pipe that branches off from a main pipe, comprising the steps of:
   preparing a lateral pipe lining material that comprises a tubular resin-absorbing material impregnated with a curable resin and having a brim attached at one end thereof, and a ring-shaped sealing member composed of an elastic material attached on a surface of the brim on the lateral pipe opening side at a portion on the tubular resin-absorbing material side, the ring-shaped sealing member having an annular protruding part on an upper surface thereof that has an outer diameter substantially the same size as the inner diameter of the lateral pipe opening;
   applying a bonding resin to a surface of the brim on the lateral pipe opening side;
   bringing the brim close to the peripheral edge of the lateral pipe opening of the main pipe so that the annular protruding part of the sealing member is inserted into the lateral pipe opening and seals a gap between an inner peripheral surface of the main pipe and a surface of the brim facing the inner peripheral surface thereof;
   evertedly inserting the lateral pipe lining material into the lateral pipe in a state in which the bonding resin applied to the brim comes into contact with the inner peripheral surface of the main pipe; and
   curing the resin in the lateral pipe lining material in a state in which the evertedly inserted lateral pipelining material is pressed against the inner peripheral surface of the lateral pipe, the brim of the lateral pipe lining material being bonded to the inner peripheral surface of the main pipe via the bonding resin, thereby integrating the lateral pipe lining material and the main pipe.

6. A lateral pipe lining method according to claim 5; further including the step of applying a bonding resin to one or more ring-shaped grooves formed on the surface of the brim on the lateral pipe opening side.

7. A lateral pipe lining method according to claim 5; further including the step of attaching a member to the surface of the brim on the lateral pipe opening side for preventing the applied bonding resin from flowing away from the brim.

8. A lateral pipe lining method according to claim 5, wherein the lateral pipe is lined after the main pipe is lined, and the brim of the lateral pipe lining material is bonded via the bonding resin to an inner peripheral surface of a main pipe lining material applied in the main pipe.

9. A lateral pipe lining method for lining a lateral pipe that branches off from a main pipe, comprising the steps of:
   preparing a lateral pipe lining material that comprises a tubular resin-absorbing material impregnated with a curable resin and having a brim attached at one end thereof;
   positioning the lateral pipe lining so that the brim faces a peripheral edge of a lateral pipe opening of the main pipe;
   attaching a ring-shaped sealing member composed of an elastic material on a surface of the brim on the lateral pipe opening side at a portion on the tubular resin-absorbing material side, the ring-shaped sealing member having an annular protruding part on an upper surface thereof that has an outer diameter substantially the same size as the inner diameter of the lateral pipe opening;
   applying a bonding resin to the surface of the brim on the lateral pipe opening side;
   bringing the brim close to the peripheral edge of the lateral pipe opening of the main pipe so that the annular protruding part of the sealing member is inserted into the lateral pipe opening and seals a gap between an inner peripheral surface of the main pipe and a surface of the brim facing the inner peripheral surface thereof;
   evertedly inserting the lateral pipe lining material into the lateral pipe in a state in which the bonding resin applied to the brim comes into contact with the inner peripheral surface of the main pipe; and
   curing the resin in the lateral pipe lining material in a state in which the evertedly inserted lateral pipe lining material is pressed against the inner peripheral surface of the lateral pipe, the brim of the lateral pipe lining material being bonded to the inner peripheral surface of the main pipe via the bonding resin, thereby intergrating the lateral pipe lining material and the main pipe.

10. A lateral pipe lining method according to claim 9; further including the step of applying a bonding resin to one or more ring-shaped grooves formed on the surface of the brim on the lateral pipe opening side.

11. A lateral pipe lining method according to claim 9; further including the step of attaching a member to the surface of the brim on the lateral pipe opening side for preventing the applied bonding resin from flowing away from the brim is attached to the surface of the brim.

12. A lateral pipe lining method according to claim 9; wherein the lateral pipe is lined after the main pipe is lined, and the brim of the lateral pipe lining material is bonded via the bonding resin to an inner peripheral surface of a main pipe lining material applied in the main pipe.

* * * * *